Figure 1:
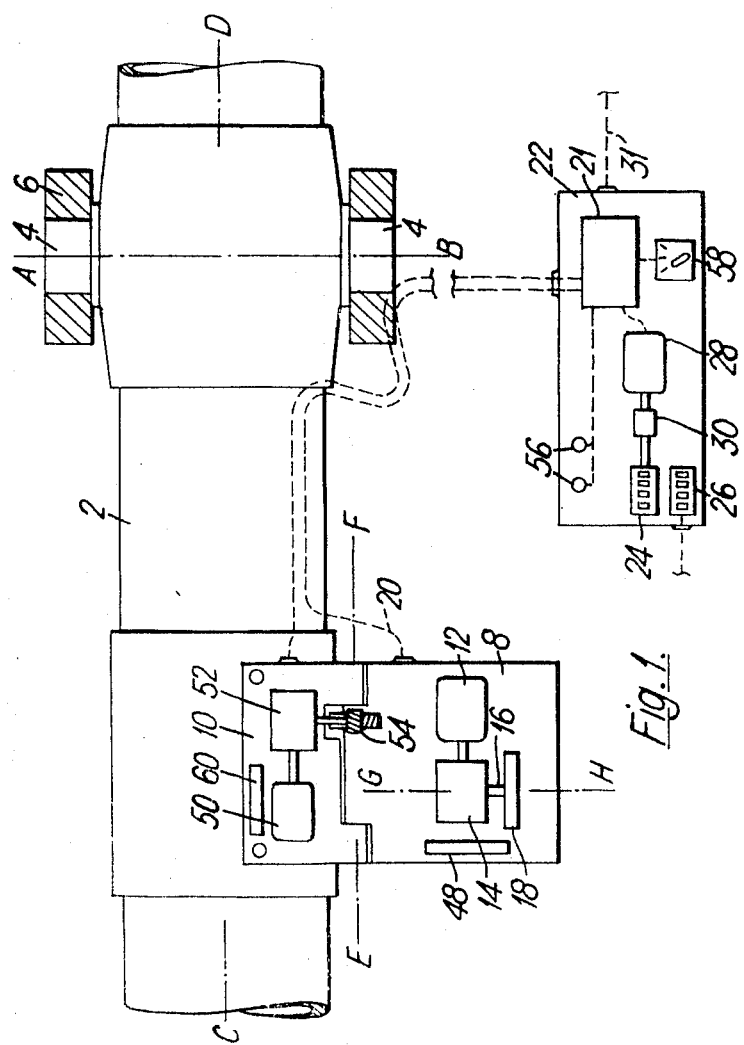

United States Patent

[11] 3,596,363

| [72] | Inventors | Allan Maurice Squire<br>Harpenden;<br>Peter Duncan Morris, Knebworth, both of, England |
|---|---|---|
| [21] | Appl. No. | 766,218 |
| [22] | Filed | Oct. 9, 1968 |
| [45] | Patented | Aug. 3, 1971 |
| [73] | Assignee | British Aircraft Corporation Limited<br>London, England |
| [32] | Priority | Oct. 13, 1967 |
| [33] | | Great Britain |
| [31] | | 46892/67 |

[54] EQUIPMENT FOR AIMING GUNS OR OTHER APPARATUS IN ELEVATION
5 Claims, 3 Drawing Figs.

[52] U.S. Cl. ............................................. 33/206 D,
89/41 T, 33/49 D
[51] Int. Cl. ............................................. G01c 9/06
[50] Field of Search............................................ 33/206.5 L,
211, 213, 214; 324/120; 340/206; 38/49 D; 89/41 T

[56] References Cited
UNITED STATES PATENTS

| 2,647,323 | 8/1953 | Johnson | 33/141.5 |
| 2,675,627 | 4/1954 | Hinchman | 33/205 |
| 3,262,105 | 7/1966 | Bell | 340/206 X |
| 3,327,229 | 6/1967 | Huelsman | 324/120 X |
| 3,371,542 | 3/1968 | Swarts | 33/206.5 LX |
| 3,387,491 | 6/1968 | Adams | 340/206 X |
| 3,440,645 | 4/1969 | Feigleson | 324/120 X |
| 3,486,238 | 12/1969 | Hanson | 33/206.5 LX |
| 1,306,413 | 6/1919 | Dawson et al. | 33/49 D |
| 1,484,274 | 2/1924 | Perham | 33/49 D |
| 1,758,273 | 5/1930 | Becker | 33/49 D |
| 2,511,614 | 6/1950 | Agins | 33/49 D |

*Primary Examiner*—Leonard Forman
*Assistant Examiner*—Dennis A. Dearing
*Attorney*—Sughrue, Rothwell, Mion, Zinn and Macpeak ABSTRACT: An apparatus for determining a given angular relationship to the gravitational vertical. A saddle is provided which is attached to the object and incorporates an electrically indicating tilt-sensitive device. A mounting with two tilt-sensitive devices is pivotally connected to the saddle. A number of electric motors are arranged to move the tilt-sensitive devices relative to the mounting to produce an electrical signal indicative of the angular position of the object. A transducer is connected to receive the signal and to indicate the angle of elevation of the object. The tilt-sensitive device can comprise a curve tube containing an electrolyte and a bubble of air, which is incorporated into a bridge circuit to indicate the change in the conductivity which occurs when the tilt-sensitive devices are removed from the horizontal plane.

EQUIPMENT FOR AIMING GUNS OR OTHER APPARATUS IN ELEVATION

Angle-measuring devices based upon the use of a spirit level or other gravity reference device are commonly used to enable a gun to be set to a desired elevation.

The present invention concerns equipment which has been devised primarily for gun laying, but can be used with any apparatus which requires to be set in a given angular relationship to the gravitational vertical, e.g. a machine tool component; radar or laser systems for target illumination; or a telescope. Also a less accurate version of the equipment can be used for other purposes such as measuring the roll of a ship, the turn and bank of an aircraft, or the attitudes of cranes.

Equipment according to the present invention, for indicating the angle of elevation of an object, comprises a mounting which can be attached to the object, an electrically indicating tilt-sensitive device coupled to the mounting with provision for relative rotation about an axis, which in use is substantially horizontal, an electric motor arranged to move the device relatively to the mounting about the axis, a circuit connected electrically to the device and to the motor and arranged to actuate the motor whenever the device becomes inclined from a horizontal attitude, the direction of movement being such as to reduce the inclination of the device, means, constituted either by the said circuit or by a rotary transmitter driven by the motor, for supplying an electric signal indicative of changes in the angular position of the device relative to the mounting, and a transducer connected to receive the signal and arranged to indicate the angle of elevation of the object.

Figure 2:
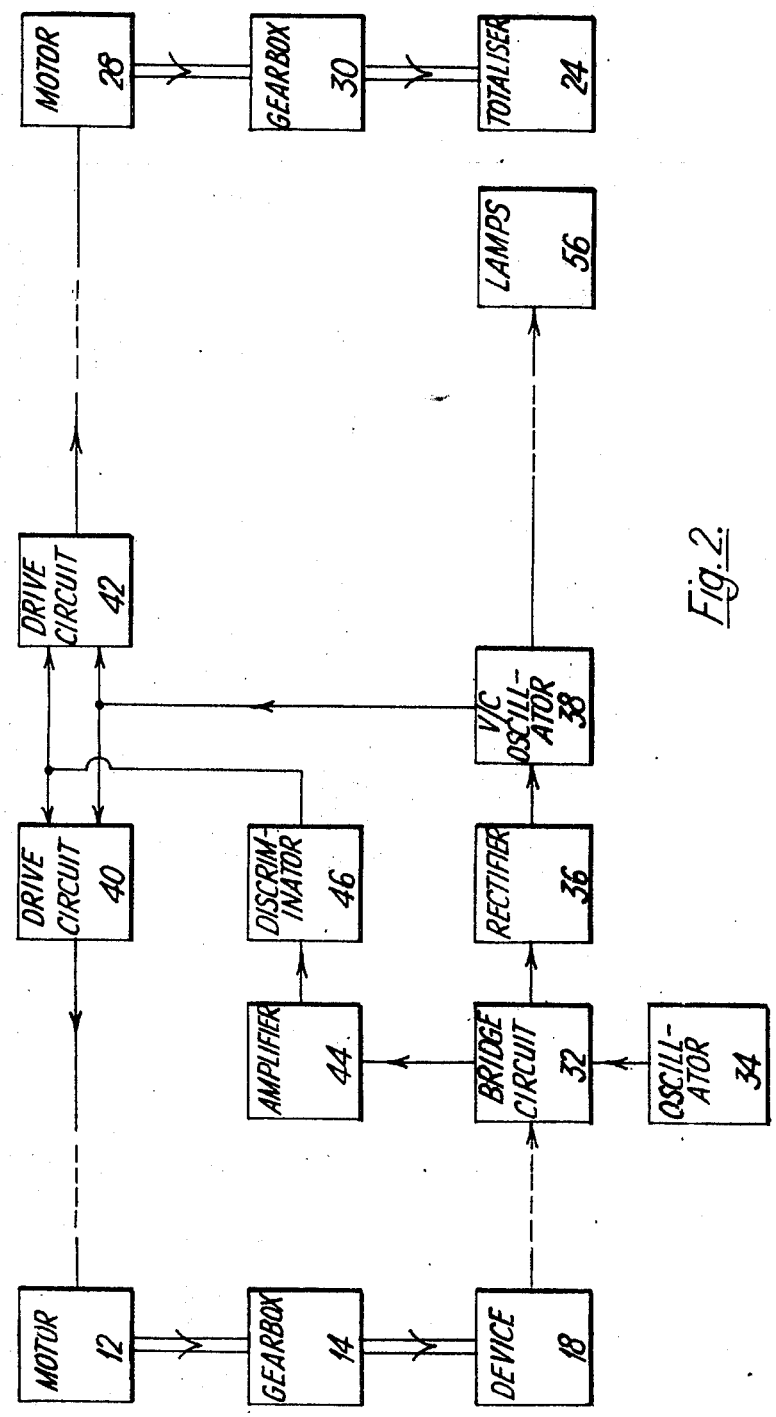

The invention will be explained in more detail with reference to the example shown in the accompanying drawings, in which:

FIG. 1 is a plan of the equipment, associated with a gun; and
FIG. 2 is a block diagram of the equipment; and
FIG. 3 is a modified embodiment of the present invention.

In the example shown, the tilt-sensitive device is in the form of a slightly curved tube, with its upper inner surface convex upwards, containing electrolyte and a bubble of air, there being electrodes at each end and the center bottom of the tube. The electrodes are connected into a bridge-type circuit, which assumes a neutral condition when the bubble is in the center of the top of the tube. Slight tilting of the tube displaces the bubble and unbalances the bridge circuit.

As shown in FIG. 1, a gun barrel 2, of which only a fragment is shown, is mounted by trunnions 4 in a carriage indicated at 6. The barrel is elevated, by mechanism not shown, about an axis AB.

The purpose of the equipment is to indicate the angle of the axis CD of the barrel 2 relative to the horizontal, the elevation mechanism being operated until this indication corresponds to a desired value.

A mounting 8 is pivoted on an axis EF to a saddle 10 which is fixed to the barrel 2. The purpose of the pivoting on the axis EF is to permit correction to be made for the fact that the axis AB may be tilted somewhat in relation to the horizontal plane, by reason of local conditions. This is explained in more detail below.

On the mounting there are a motor 12 and a reduction gearbox 14. The output shaft 16 has its axis GH lying at right angles to the axis CD of the gun barrel, and the shaft 16 carries a tilt-sensitive device 18.

Wires within a flexible cable 20 connect the motor 12 and the device 18 to a remote box 22 which contains the indicator, in this case in the form of a revolution totalizer giving an output in the form of numerals visible through windows at 24. This may be compared with numerals displayed in an adjacent totalizer 26 which receives an input from aim prediction equipment, not shown.

The totalizer 24 is driven by a motor 28 through gearing 30. A power supply, not shown, is connected at 31.

The interconnection of the various components of the equipment is indicated in block form in FIG. 2. The individual items of equipment are obtainable on the market, and the internal details of the individual items are not part of the present invention.

The bridge circuit 32 which contains the tilt-sensitive device 18 is powered by an oscillator 34. The output from the bridge circuit passes to a rectifier 36, and controls the output frequency of a voltage-controlled oscillator 38. The output of the oscillator is supplied to drive circuits 40 and 42 from the motors 12 and 28. In addition, the output from the bridge circuit 32 is also supplied through an amplifier 44 to a discriminator 46, which supplies signals to the drive circuits 40 and 42 so as to determine the directions of rotation of the motors.

These components in the central part of FIG. 2 are indicated in FIG. 1 by a single square 21.

In this particular example, each of the motors 12 and 28 is a pulse-operated stepping motor. The effect of the arrangement so far described is that, whenever the device 18 becomes inclined from a horizontal attitude, the oscillator 38 delivers a succession of pulses to each of the motors for so long as the device is inclined from a horizontal attitude, the frequency of the pulses being proportional to the amount of inclination of the device and the sign of the pulses being such as to cause the motor 12 to reduce the inclination of the device. At the same time, the angular position reached by each of the motors 12 and 28 is directly determined by the arithmetic total of the pulses supplied to each of the motors since they were in some datum position. Accordingly, the totalizer driven by the motor 28 serves to indicate the instantaneous angular position of the device 18 relative to the mounting 8.

The purpose of the frequency of the pulses being proportional to the amount of inclination is to prevent the device from overshooting when returning to the horizontal and to allow the equipment to indicate accurately the inclination of the object to the horizontal even when the inclination is rapidly changing.

Because of the fact that the operation of the equipment ensures that the device 18 never departs from the horizontal without such departure being immediately counteracted, the indication of the angular position of the device 18 relative to the mounting 8 is also, within the limits of the speed of followup of the equipment, an indication of the inclination of the gun barrel 2 to the horizontal.

This is subject to the fact that the axis GH must be horizontal. If, owing to a departure of the axis AB from the horizontal, the axis GH is tilted, this fact is detected by a further tilt-sensitive device 48 attached to the mounting 8 and this is connected to cause actuation of a motor 50 driving a gearbox 52 actuating a gearing 54 associated with the pivot axis EF so as to tilt the mounting 8 relatively to the saddle 10 until the axis GH is horizontal.

The circuit includes warning lamps 56, which are controlled by the oscillator 38, and serve to indicate if the rate of elevation approaches or exceeds the maximum which the equipment is capable of handling without appreciable lag.

The box 22 also includes a switch 58 which can be operated to bring into circuit a tilt-sensitive device 60 carried directly by the saddle 10. This enables the totalizer 24 to be adjusted to read zero when the axis CD of the barrel is horizontal.

In the example shown in the drawings, the circuit which is connected to the device 18 and to the motor 12 serves to provide a signal, namely the pulses, indicative of changes in the angular position of the device relative to the mounting, and the motor 28 and totalizer 24 constitute a transducer connected to receive the signal and arranged to indicate the angle of elevation of the object.

Alternatively, the signal may be derived from rotation of some part of the transmission between the motor 12 and the device 18. In that case, the motor 12 need not be of a pulse-operated kind. For example, it could be a direct current torque motor 61, and the signal be provided by a shaft angle digitizer 59 incorporated in the transmission between the motor and the device.

The visual indication supplied by the equipment need not necessarily be provided by a totalizer. It could for example be provided by an electronic decoder and cold cathode display tubes.

Furthermore, it is not essential for the electric signal indicative of changes in the angular position of the device relative to the mounting to be in digital form. It could be in analogue form leading to an output represented for example by a needle rotating on a dial. For example, the transmission between the motor 12 and the device 18 may drive a device such as that known under the name "Selsyn" which transmits a signal on three wires indicative of the angular position of a rotor, this signal being converted back into angular rotation of a shaft by a similar receiver.

In order to economize on consumption of electric power, there may be arrangements for switching off the circuit connecting the device 18 and the motor 12 at times when the angular position of the gun barrel is not of interest. In this situation, the mounting is likely to be in an inclined position when the circuit is next switched on. Thereupon, the circuit will operate to restore the mounting to a level condition, whereupon the output of the totalizer will give a correct indication of the position of the gun barrel at that time.

Equipment according to the present invention is capable of considerable accuracy. For example, if the range of movement of the gun barrel is from minus 200 to plus 1,400 mils, the motors 12 and 28 may operate in steps of 0.25 mil (0.0025 radian).

The equipment requires no mechanical connection between the indicator and the gun barrel or the gun-elevating mechanism. It has been found that the equipment will withstand the shocks of repeated firing without loss of accuracy.

We claim:

1. Equipment for indicating remotely the angle of elevation of an object, which object has a first axis arranged to be elevated by rotation about a second axis which may not be truly horizontal, the equipment comprising attachment means adapted to be fixed to the object; a mounting hinged to the attachment means about a third axis, which is adapted to be fixed parallel to the first axis; an electrically indicating tilt-sensitive device coupled to the mounting with provision for relative rotation about a fourth axis; automatic means for tilting the mounting relatively to the attachment means about the third axis and operative to maintain the fourth axis truly horizontal despite inclinations of the second axis; an electric motor arranged to rotate the tilt-sensitive device relatively to the mounting about the fourth axis; a circuit connected electrically to the tilt-sensitive device and to the motor and arranged to actuate the motor whenever the tilt-sensitive device becomes inclined from a horizontal attitude, the direction of consequent relative rotation of the tilt-sensitive device and the mounting being such as to reduce the inclination of the tilt-sensitive device from the horizontal; means for supplying an electric signal indicative of changes in the angular position of the tilt-sensitive device relative to the mounting, and a transducer remote from the attachment means and electrically connected to receive the signal and arranged to indicate, visually in response to the signal, the angle of elevation of the first axis.

2. Equipment according to claim 1, in which the motor is a pulse-operated stepping motor, the circuit is arranged to transmit a succession of pulses to the motor so long as the tilt-sensitive device is inclined from a horizontal attitude, the sign of the pulses being such as to cause the motor to reduce the inclination of the tilt-sensitive device, and the transducer is constituted by a second pulse-operated stepping motor which drives a revolution totalizer.

3. Equipment according to claim 2, in which the circuit is arranged to transmit pulses at a frequency proportional to the amount of inclination of the tilt-sensitive device.

4. Equipment according to claim 1, including a connection between the motor and the tilt-sensitive device; the motor is a direct current torque motor, and the signal is provided by a shaft angle digitizer incorporated in the connection between the motor and the tilt-sensitive device.

5. An angle-measuring device for determining the relative position of an object comprising a saddle mounted directly on the object; a mounting pivotally connected to the saddle; tilt-indicating means connected to the saddle to signal the degree of tilt of the object in a first direction; a first and second tilt-indicating means mounted on the mounting to signal the degree of tilt in the above-mentioned first direction and in a relatively perpendicular second direction respectively; means for rotating the mounting about its pivotal connection to the saddle in response to the tilt signal from the second tilt-indicating means to ensure that the mounting is horizontal in the second direction; means for rotating the first tilt-indicating means on the mounting until it is in a horizontal position in the first direction; electrical means connected to each of the tilt-indicating means for generating a signal corresponding to the degree of tilt from the horizontal and output means including a totalizer connected to the electrical means for producing a signal indicating the angular position of the object with respect to the horizontal in the first direction.